(12) United States Patent
Janovec (10) Patent No.: US 6,224,792 B1
(45) Date of Patent: May 1, 2001

(54) CUTTING AND EDGE SEALING CELLULAR RETROREFLECTIVE SHEETING

(75) Inventor: Jeffrey D. Janovec, River Falls, WI (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/290,289

(22) Filed: Apr. 13, 1999

(51) Int. Cl.⁷ .................................................. B29D 11/00
(52) U.S. Cl. ........................ 264/1.6; 156/251; 156/515; 264/1.9; 264/2.7; 264/163
(58) Field of Search .................................. 156/251, 515; 264/138, 163, 1.7, 1.9, 2.7, 1.6

(56) References Cited

U.S. PATENT DOCUMENTS

| | | | |
|---|---|---|---|
| 2,117,452 | 5/1938 | Robinson et al. | 154/42 |
| 2,551,811 | 5/1951 | Mueller | 164/77 |
| 3,190,178 | 6/1965 | McKenzie | 88/82 |
| 3,257,256 | 6/1966 | Lehmacher et al. | 156/495 |
| 3,384,528 | 5/1968 | Lehmacher et al. | 156/515 |
| 3,457,132 | 7/1969 | Tuma et al. | 156/515 |
| 3,924,929 | 12/1975 | Holmen et al. | 350/103 |
| 4,025,159 | 5/1977 | McGrath | 350/105 |
| 4,384,908 | 5/1983 | Kleist | 156/88 |
| 4,656,072 | 4/1987 | Coburn, Jr. et al. | 428/40 |
| 4,721,501 | 1/1988 | Herrington | 493/193 |

(List continued on next page.)

FOREIGN PATENT DOCUMENTS

| | | |
|---|---|---|
| 63 825/80 | 5/1981 | (AU) . |
| 0 535 998 A1 | 4/1993 | (EP) . |
| 0 615 491 B1 | 9/1994 | (EP) . |
| 2 255 312 | 11/1992 | (GB) . |
| 2 267 865 | 12/1993 | (GB) . |
| WO 95/26870 | 10/1995 | (WO) . |
| WO 97/19815 | 6/1997 | (WO) . |

OTHER PUBLICATIONS

Patent Abstracts of Japan 55065904, Published May 17, 1980.
PCT International Search Report mailed Jun. 16, 2000.
ASTM D 1238–95, "Standard Test Method for Flow Rates of Thermoplastics by Extrusion Plastometer", pp. 255–263.
ASTM D 4956–94, "Standard Specification for Retroreflective Sheeting for Traffic Control", pp. 521–526.
ASTM E 810–94, "Standard Test Method for Coefficient of Retroreflection of Retroreflective Sheeting", pp. 818–824.
Code of Federal Regulations, Transportation, 49, Parts 400 to 999, Revised Oct. 1, 1996, pp. 227–281.
3M Information Folder 1.10 Cutting, Matching, Premasking and Prespacing of 3M™ Scotchlite™ Reflective Sheetings and Films, Apr. 1998.

*Primary Examiner*—Mathieu D. Vargot
(74) *Attorney, Agent, or Firm*—Doreen S. L. Gwin (57) ABSTRACT

A method for cutting and edge sealing cells of cellular retroreflective sheeting is disclosed using a specially designed apparatus and tool. Sheeting having a thickness T is heated to a thermoforming temperature to form a heated sheeting. Pressing the unheated tool, the heated sheeting, and a substrate together results in cutting and edge sealing of the heated sheeting. The tool has a radiused ridge for cutting and edge sealing with the shape of the ridge similar to the shape desired for the edge seal. A height H of the ridge is defined relative to the thickness of the sheeting. The fraction of the ridge height to the thickness of the sheeting is less than one and more than 0.2. The tools may be mounted on a perimeter of a wheel for continuously slitting and edge sealing strips of cellular sheeting. The retroreflectivity of the sheeting is maximized by (1) minimizing the width of the sealed edges while (2) maximizing the number of closed cells along the sealed edges that can withstand a water holdout test.

17 Claims, 6 Drawing Sheets

U.S. PATENT DOCUMENTS

| | | | |
|---|---|---|---|
| 4,897,136 | 1/1990 | Bailey et al. | 156/145 |
| 4,999,081 | 3/1991 | Buchanan | 156/515 |
| 5,000,812 | 3/1991 | Murphy | 156/268 |
| 5,064,272 | 11/1991 | Bailey et al. | 359/541 |
| 5,066,098 | 11/1991 | Kult et al. | 359/540 |
| 5,069,964 | 12/1991 | Tolliver et al. | 428/325 |
| 5,110,399 | 5/1992 | Yoshida et al. | 156/515 |
| 5,138,488 | 8/1992 | Szczech | 359/529 |
| 5,378,520 | 1/1995 | Nagaoka et al. | 428/72 |
| 5,450,235 | 9/1995 | Smith et al. | 359/529 |
| 5,601,915 | 2/1997 | Ochi et al. | 428/323 |
| 5,614,286 | 3/1997 | Bacon, Jr. et al. | 428/161 |
| 5,632,946 | 5/1997 | Bacon, Jr. et al. | 264/212 |
| 5,691,846 | 11/1997 | Benson, Jr. et al. | 359/530 |
| 5,706,132 | 1/1998 | Nestegard et al. | 359/529 |
| 5,714,223 | 2/1998 | Araki et al. | 428/68 |
| 5,754,338 | 5/1998 | Wilson et al. | 359/530 |
| 5,763,049 | 6/1998 | Frey et al. | 428/172 |
| 5,777,790 | 7/1998 | Nakajima | 359/536 |

CUTTING AND EDGE SEALING CELLULAR RETROREFLECTIVE SHEETING

TECHNICAL FIELD

This invention relates to cellular retroreflective sheeting and to a method of thermally sealing cells formed along an edge while cutting cellular retroreflective sheeting.

BACKGROUND

Cellular retroreflective sheeting comprises a base member, a layer of retroreflective elements, and a transparent face member in spaced relation away from the base member by a network of narrow intersecting seal leg members that form hermetically sealed cells within which the retroreflective elements are isolated from retroreflective elements of different cells. The layer of retroreflective elements comprises either glass microspheres or cube corner elements. In plan view, the network of seal leg members can form patterns, such as, for example, square, rectangular, circular, hexagonal, or chain link. Examples of cellular retroreflective sheeting are described in U.S. Pat. No. 4,025,159 (McGrath) and U.S. Pat. No. 5,706,132 (Nestegard). This type of sheeting may also be called encapsulated lens sheeting.

Cellular retroreflective sheeting must sometimes be cut to fit, for example, a sign. A process called slitting may be used to cut sheeting into strips having predetermined widths. Depending on customer requirements, the sheeting may need to be cut to widths as little as approximately one centimeter. Cutting of retroreflective sheeting is described in Information Folder 1.1 "Cutting, Matching, Premasking, and Prespacing of SCOTCHLITE™ Reflective Sheetings and Films" (April, 1998) available from Minnesota Mining and Manufacturing Company (3M) of Saint Paul, Minn. Sheeting may be cut with a knife having a blade with a sharp edge or point. Single sheets can be hand cut, die cut, or cut electronically using a computer controlled machine. Volume cutting can be accomplished by methods such as band sawing, roll cutting, or guillotining. When cellular sheeting is cut, a cut edge is formed and the cells along the edge are no longer sealed. These open cells allow water and dirt to enter the edge of the sheeting and destroy the effectiveness of the retroreflective elements. For one example, the open cells may be exposed to adverse weather conditions. For another example, the sheeting may be subjected to adverse handling conditions, such as being cleaned by high pressure washing with water. This cleaning procedure is typically done to the sheeting after it is adhered to a substrate, for example, the canvas used for truck covers. Numerous unsatisfactory attempts have been made to minimize the width of the sealed edge while hermetically sealing the open cells along the cut edge of the sheeting. Some examples of prior methods for cutting and sealing of various materials are as follows:

(1) A sharp blade is used to cut the material and a liquid sealer is brushed onto the cut edge. This method is time consuming, depends on the installer's skill, and the sealer may contain solvents harmful to the environment.

(2) A two step process is used in which the material is first sealed with heat and pressure followed by cutting through the sealed area. This method requires a wide seal and accurate registration between the seal and the cut.

(3) The material may be cut and then the cut edge sealed via an ultrasonic technique. However the ultrasonic technique has a very small process window that changes over time, thereby resulting in a edge sealing process that is difficult to control.

(4) The material may be thermal pinch cut by bringing two pieces of the material together between two heated anvils. It is difficult to control and keep this type of method operating continuously without fouling of the anvils with plastic debris.

(5) Fabric is heated by a hot anvil with the cutting blade always in contact with the anvil. This method results in a rough cut edge, with debris along the edge. Further, the hot blade can retain melted sheeting after a time and thus loses its effectiveness in cutting.

(6) A heated blade may be used to cut the material and seal simultaneously as disclosed in publication WO9526870 (Luhman). While having significant advantages over other prior methods, this method can result in having some of the same problems cited in method 5 above.

The numerous disadvantages associated with these prior methods indicate the need for a new, effective, and efficient cutting and edge sealing method.

Thus there remains a need to cut and edge seal cellular sheeting so as to retain maximum retroreflectivity regardless of subsequent exposure to adverse handling and/or weather conditions.

SUMMARY OF THE INVENTION

Cellular retroreflective sheeting is made having sealed edges with a width preferably less than 1.5 mm, and preferably with at least 95% of the cells along the sealed edges unfilled with water after being subjected to a water holdout test. A method of cutting and edge sealing cellular retroreflective sheeting includes the steps of positioning the sheeting on a substrate, wherein the sheeting has an initial thickness T; heating the sheeting to a thermoforming temperature to yield a heated sheeting; providing at least one unheated tool having a radiused ridge thereon, with the ridge having a height H, wherein the fraction of H/T is less than one and at least 0.2; maintaining the tool at a temperature below the thermoforming temperature; and pressing the tool, the heated sheeting, and the substrate together until the tool cuts and edge seals the cells to form sealed edges.

Preferably, the tool shape approximates the desired shape of the sealed edge. The tool is preferably maintained at a temperature below the thermoforming temperature. A preferred embodiment is to cool the tool to a temperature less than 30° C. with the thermoforming temperature of the heated sheeting at more than 70° C. Suitable methods for cooling the tool include, for example, (a) increasing the diameter of the wheels, and/or (b) blowing air onto the tool. In a preferred embodiment, the fraction of H/T is maintained within the range of about 0.3 to 0.8.

One embodiment of the method comprises the steps of rotating a substrate (such as a can having an internal means of heating, e.g., the hot can contains a hot fluid); unwinding the sheeting from a roll with the width of the sheeting rotating on the substrate to yield a heated sheeting; rotating at least one wheel having a perimeter with a tool mounted thereon, each wheel spaced across the width of the sheeting, and pressing the tool, the heated sheeting, and the substrate together until the tool cuts and edge seals the cells to form sealed edges. If desired, heat may be added to the heated sheeting using a heating means external to the substrate. This embodiment permits the continuous sealing and slitting of multiple strips of sheeting.

In preferred embodiments, the method provides cellular sheeting having a sealed edge with a width preferably less than 1.5 mm, more preferably less than 0.6 mm, and most preferably less than 0.2 mm. After being subjected to a water holdout test, preferably at least 80%, more preferably at least 90%, and most preferably at least 95% of the cells along the sealed edge are found to be unfilled with water.

BRIEF DESCRIPTION OF DRAWINGS

The present invention will be described in greater detail in regard to the attached drawings, in which.

These figures, which are idealized and not to scale, are intended to be merely illustrative and non-limiting.

DETAILED DESCRIPTION OF ILLUSTRATIVE EMBODIMENTS

The present invention provides a method for cutting and thermally edge sealing cellular retroreflective sheeting. Retroreflectivity of the sheeting is maxiniized both by (1) minimizing the width of the sealed edge, and by (2) eliminating open cells along the edge of the sheeting that collect dirt and water during subsequent adverse handling, cleaning, and/or outdoor exposure to weather. Moreover, this invention solves problems in cutting and edge sealing cellular sheeting as follows:

(1) A face member and a base member of different chemical compositions can be used.

(2) Brittle members that tend to fracture away from the edge seal during cutting can be used.

(3) An adhesive layer on a protective liner may be disposed beneath the base member during the cutting and edge sealing step.

(4) The temperature required for edge sealing preferably did not destroy the effectiveness of the retroreflective elements, and (5) A reliable procedure, a water holdout test, is disclosed to ascertain whether edge sealing is satisfactory without waiting for long periods of exposure to outdoor weather.

I Types of Cellular Sheeting

A. Glass Microspheres as Retroreflective Elements

Figure 1:
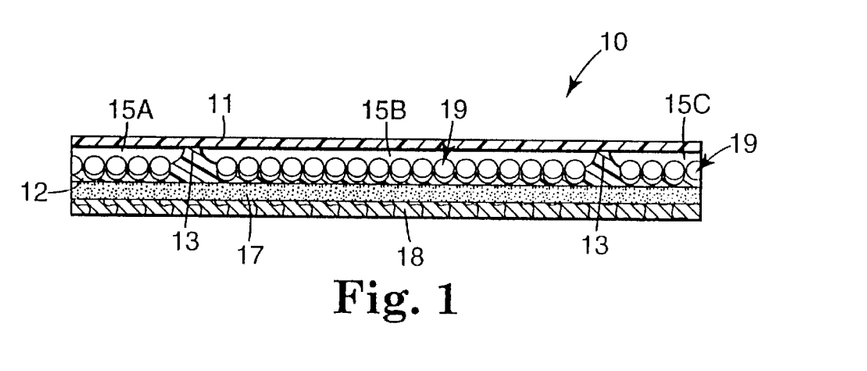
FIG. 1 is a sectional view of cellular sheeting having glass beads as retroreflective elements.

FIG. 1 shows a sectional view of a suitable cellular retroreflective sheeting 10 having a substantially transparent face member 11, a base member 12, and supporting seal leg members 13 holding the face member in spaced relation to the base member. The face member, base member, and seal leg members form air cells 15. The members forming cells are called encapsulating members. At least one of the encapsulating members is thermoformable, that is, it deforms under thermal conditions with or without the addition of pressure. Thermoplastic polymers are especially suitable for thermal edge sealing. The term "thermoplastic" is used in its conventional sense to mean a material that softens when exposed to heat and returns essentially to its original condition when cooled. The temperature required to cut and seal the edges on the cellular sheeting is called the thermoforming temperature. The thermoforming temperature will vary depending on the materials used for the encapsulating members. The thermoforming temperature is sufficiently high to result in the encapsulating members forming sealed edges after the edge has been cut, but yet not so high as to damage the retroreflectivity of the sheeting. Thermoforming temperatures may range from about 60 degrees C. to about 150 degrees C. More preferably the thermoforming temperature is in a range from about 80 degrees C. to 120 degrees C. An example of cellular retroreflective sheeting of this type is available from 3M under the designation SCOTCHLITE™ High Intensity Grade Sheeting Series 3870 white. Description of retroreflection and retroreflective sheeting is found in "Standard Specification for Retroreflective Sheeting for Traffic Contror" *ASTM D* 4956–94 (November, 1994). Cellular sheeting, classified as Type III, is illustrative of one type of material suitable for cutting and edge sealing according to the present invention.

Illustrative examples of cellular sheeting using microspheres, also called glass beads, as the retroreflective elements are disclosed in U.S. Pat. No. 3,190,178 (McKenzie); U.S. Pat. No. 4,025,159 (McGrath); U.S. Pat. No. 4,897,136 (Bailey); U.S. Pat. No. 5,064,272 (Bailey); U.S. Pat. No. 5,066,098 (Kult); U.S. Pat. No. 5,069,964 (Tolliver); U.S. Pat. No. 5,714,223 (Araki); and U.S. Pat. No. 5,378,520 (Nagaoka); the contents of each of which is incorporated by reference.

As shown in FIG. 1, the left cell 15A along the left edge and the right cell 15C along the right edge are open because seal leg members are not present on all sides of the cell, whereas the central cell 15B is closed or sealed because the encapsulating members are present on all sides of cell 15B. The base member has a first side and a second side. Optional members on the second side of the base member are an adhesive layer 17 and a protective liner 18. Usually, though not necessarily, both the adhesive layer and the protective liner are present during the cutting and edge sealing of the sheeting.

The face member may also be called the cover film, top film, or top coat. The face member serves as a substantially transparent layer that protects the optical elements from a variety of possible destructive effects, such as dirt, water, and exposure to weather and outdoor conditions. The face member may be a single material but may also comprise layers of different materials. Materials selected for the face member are preferably dimensionally stable, durable, weatherable, and readily formable into a desired configuration. A representative material that is especially useful includes polymethylmethacrylate. Illustrative examples of other face member materials are fluorinated polymers, ionomeric ethylene copolymers, low density polyethylenes, plasticized vinyl halide polymers, polyethylene copolymers, polyethylene terephthalate, cellulose acetate, cellulose acetate butyrate, ethylene/acrylate acid copolymer, and aliphatic and aromatic polyurethanes. The face member is selected to be sufficiently thick to provide the above desirable properties. The thickness of the face member may preferably be between about 0.025 millimeters to 0.25 millimeters thick, and more preferably will be between 0.05 millimeters to 0.1 millimeters. In addition to thermoplastic face member materials, other materials that undergo reaction both internally and with material used for the seal leg members may be used. The face member may be multilayer as disclosed in U.S. Pat. No. 5,066,098 (Kult). For example, suitable face members may have a Vicat softening point between 140° C. to 170° C. when tested according to ASTM D1525.

The base member may also be called the binder layer or cushion coat. The base member typically has a first side containing a layer of retroreflective elements and a second side typically for disposing an adhesive layer and a protective liner thereon. The base member preferably comprises a durable polymeric material that provides adhesion to the glass beads. Some illustrative examples include thermoplastic, heat-activated, ultraviolet cured, and electron beam cured polymer systems. Preferred base member materials soften sufficiently to flow under pressure at between about 75° C. to 95° C. but remain substantially firm to retain the glass beads in a layer at temperatures below about 65° C. The base member may be subsequently cured or crosslinked as taught in U.S. Pat. No. 4,025,159 (McGrath). Typical useful materials are acrylic-based monomers, such as polyethylene glycol diacrylates and hydroxymethyl diactone acrylamide and acrylic-based polymeric materials, such as acrylate or methylacrylate polymers or copolymers. The base member may further comprise adjuvents, for example, a whitening pigment, such as titanium dioxide, or other suitable colorants. The base member is sufficiently thick to retain the glass beads and yet not so thick that material is wasted or the sheeting becomes so thick that edge sealing becomes more difficult. Thus, the thickness of the base member is at least 0.03 mm, more preferably at least 0.06 mm, but generally the thickness does not exceed about 0.3 millimeters.

The seal leg members may also be called supporting walls, bonds, septa, or simply seal legs. The seal leg members are typically formed by application of heat and pressure to the face member and the base member as disclosed in U.S. Pat. No. 3,190,178 (McKenzie). For example, the face member and the base member may be laminated together and pressed between two platens heated to 150° C. When one platen is smooth surfaced and the other has a pattern of 0.75 millimeter high by 0.25 millimeter wide protrusions, a corresponding pattern of seal leg members is formed which results in the formation of hermetically sealed air cells between the face member and the base member. An alternate method to form the seal leg members is to coat a pattern of narrow lines of the base member material onto the base member and then thermally laminate the face member to the base member. These methods and other variations for forming seal leg members are known to those skilled in the art. Seal leg members have a height sufficient to provide an air interface for the glass microspheres. The width of the seal leg members is preferably less than 1.5 millimeters and more preferably between about 0.75 millimeters to 1 millimeters, but width may be selected as desired.

A layer of retroreflective elements as glass microspheres 19 is contained within each cell so that the glass beads have an air interface. Preferably, the glass microspheres are partially embedded (e.g., to approximately half of their diameter) into the first side of the base member. Glass microspheres have diameters preferably between about 0.05 to 0.15 millimeters, with diameters more preferably between about 0.06 to 0.08 millimeters. A reflective layer is on the embedded portion of the glass microspheres. The other portion of the glass microspheres is exposed to air.

The total thickness T of the cellular sheeting containing glass microspheres as retroreflective elements is typically between about 0.25 to 0.75 millimeters, but may be more or less depending on the members used.

B. Cube Corners as Retroreflective Elements

Figure 2:
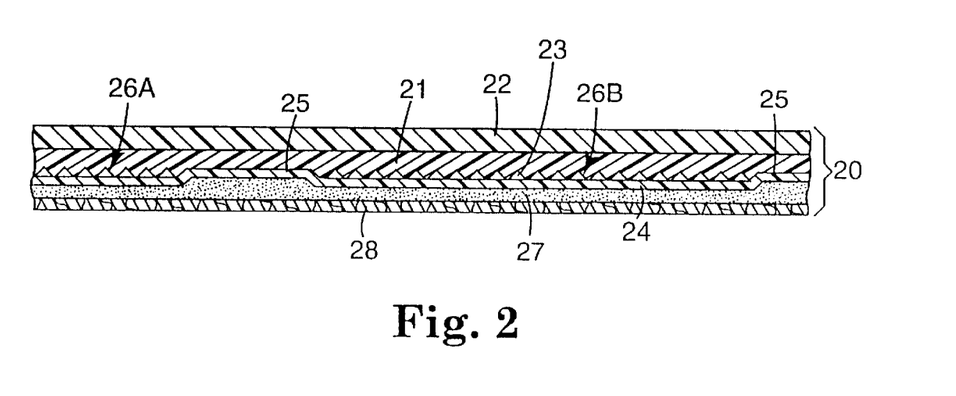
FIG. 2 is a sectional view of cellular sheeting having cube corners as retroreflective elements.

FIG. 2 shows a sectional view of a suitable cellular retroreflective sheeting 20 having a body member 21 comprising a substantially transparent face member 22 and an opposing layer of retroreflective elements as cube corner elements 23, a base member 24, and supporting seal leg members 25 holding the face member in spaced relation to the base member. Preferably, the face member, base member, and seal leg members form air cells. The members forming such cells are called encapsulating members. The description regarding thermoformability and thermoforming temperature of the encapsulating members can be found in Section A above.

Suitably, the base member has a first side and a second side. Preferably, the first side of the base member is one of the encapsulating members for an air interface for the layer of retroreflective elements contained within each cell 26. FIG. 2 shows an open cell 26A on the left edge and only one closed cell 26B. If desired, the second side of the base member may have an adhesive layer 27 and a protective liner 28 disposed thereon. Usually, though not necessarily, both the adhesive layer and the protective liner are present during the cutting and edge sealing of the sheeting. An example of cellular cube corner retroreflective sheeting is available from 3M under the designation SCOTCHLITE™ DIAMOND GRADE™ Conspicuity Grade Sheeting Series 960 white. Description of retroreflection and retroreflective sheeting is found in "Standard Specification for Retroreflective Sheeting for Traffic Contror" *ASTM* D 4956–94 (November, 1994). Cellular sheeting, classified as Type IV, Type V, and Type VI, are examples of sheeting useful for cutting and edge sealing according to the present invention.

Illustrative examples of cube corner-based retroreflective sheeting are disclosed in U.S. Pat. No. 5,138,488 (Szczech); U.S. Pat. No. 5,450,235 (Smith); U.S. Pat. No. 5,614,286 (Bacon); U.S. Pat. No. 5,706,132 (Nestegard ); U.S. Pat. No. 5714,223 (Araki ); and U.S. Pat. No. 5,754,338 (Wilson ); the contents of each of which is incorporated by reference.

As shown in FIG. 2, the body member comprises a substantially transparent face member, and an opposing cube layer which is a layer of retroreflective elements as cube corner elements. The face member may also be called an overlay film. The face member may be the same as previously discussed in the Section A above. The body member may have a land layer between the cube layer and the face member. The base triangles of the cube corner elements form part of the land layer. The land layer has a thickness preferably less than 0.25 millimeters and more preferably is desired to be at a minimum. The polymeric materials selected for the cube layer tend to be hard rigid materials with a high Vicat softening temperature relative to other polymers. Some of these materials may be brittle or easily fractured when at room temperature or lower temperatures. Illustrative examples of suitable materials for the cube layer include acrylic polymers, acrylic epoxy, polycarbonates, polyimides, and mixtures thereof.

The base member may also be called a backing sheet or sealing film. The base member has a first side in contact with either the air cells or the seal leg members. The base member preferably has a second side typically having an adhesive layer with a protective liner disposed thereon. The base member may be disposed beneath the cube layer for the purpose of hermetically sealing the bottom of the air cells. Preferably the base member comprises a thermoplastic material. Preferred polymers for use as the base member are within the styrenic family of multiphase copolymer resins as described in U.S. Pat. No. 5,754,338 (Wilson). Typically the Vicat softening temperature of the base member is about 30° C. less than that of the cube layer. The thickness of the base member is sufficient to provide an air interface for the optical elements and to protect the optical elements from exposure to factors that lower their optical efficiency, such as dirt and water. The thickness of the base member may be in the same ranges as described for the face member.

The seal leg members are typically formed by heat and pressure applied through the base member using a patterned embossing roll heated to a temperature above the temperature at which the base member thermoforms. In a typical thermal/mechanical method of forming the seal leg members, the temperature of the embossing roll is at least 10° C. higher, preferably 30° C. higher, and more preferably 50° C. higher than the Vicat softening temperature of the base member. The base member is forced into depressions of the cube corner elements to form the seal leg members. The tips of the cubes in the seal leg member may deform to form a flange as described in U.S. Pat. No. 5,754,338 (Wilson). If the cube corner elements are parted in places, the base member may also seal to the face member in these places. In addition to thermoforming techniques, other techniques, such as ultrasonic welding, radio frequency welding, thermal fusion, and reactive welding, may be used with various degrees of success. The width and height of the seal leg members was discussed in Section A above.

The cube corner elements may also be called prisms, microprisms, or triple mirrors. The basic cube corner retroreflective element is generally a tetrahedral structure having a base triangle and three mutually substantially perpendicular optical faces that cooperate to retroreflect incident light. The optical faces preferably intersect at an apex, with the base triangle lying opposite the apex. Each cube corner element also has an optical axis, which is the axis that extends through the cube corner apex and trisects the internal space of the cube corner element. Light incident on the base triangle is transmitted into the internal space, is reflected from each of the three optical faces, and is redirected back in the same general direction as the incoming incident light. As noted before, the faces of the cubes are usually exposed in the air cells to enable the sheeting to exhibit total internal reflection or "TIR". The height of the cube corner elements, defined as the length of the optical axis, is preferably as small as manufacturable for ease of sealing but may be as large as necessary while recognizing the desirability of avoiding waste of material and of increasing the thickness of the sheeting. The minimum height is preferably about 0.01 mm and the maximum height is preferably less than 1 mm. The height of the cube elements is more preferably between 0.02 to 0.5 millimeters. These elements are disposed in a cube layer. This microstructured layer is molded into the body member to yield a cube layer using any of a variety of techniques known to those skilled in the art.

The total thickness T of the cellular sheeting containing cube corner elements as the retroreflective elements is typically between about 0.25 to 0.75 millimeters, but may be more or less depending on the components used. As the thickness of the cellular sheeting decreases, the difficulty in achieving a narrow hermetically sealed edge may also decrease.

Cellular retroreflective sheeting of the type described in Section I may be cut and edge sealed by the apparatus, tools, and methods described in the next sections II and III, and according to specific illustrative examples given in section V.

Figure 3:
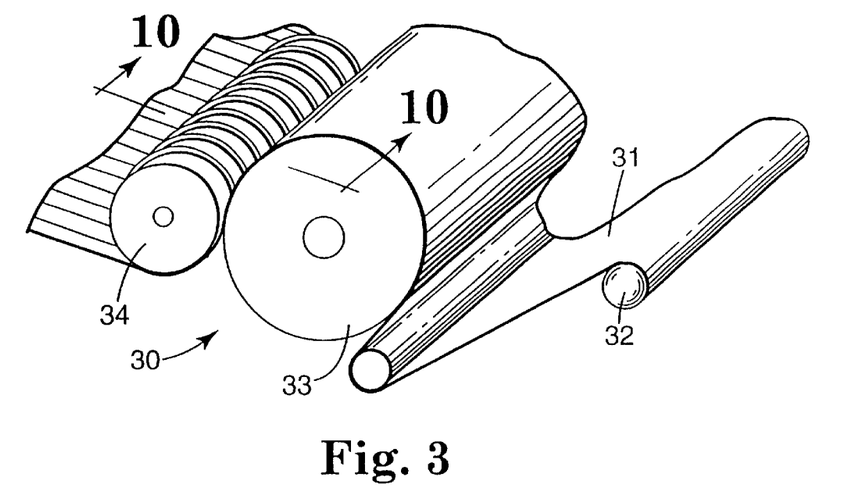
FIG. 3 is a schematic side view of apparatus used for continuously heating, slitting, and edge sealing cellular sheeting.

II. Continuous Process of Heating, Cutting, and Edge Sealing Cellular Retroreflective Sheeting FIG. 3 is a schematic drawing of an apparatus 30 used for unwinding, heating, slitting, and edge sealing cellular retroreflective sheeting 31. As initially manufactured, the sheeting may have, for example, a width of 60 to 120 centimeter and a length of 50 meters and be wound on a roll 32. If desired, the sheeting may be pre-heated in an oven or heated by some source as it proceeds to the cutting and edge sealing step. As shown in FIG. 3, a preferred method of heating the sheeting is by wrapping a portion of the sheeting on the surface of a rotating hot can 33 with the sheeting in contact with the surface of the can for a sufficient time to form a heated sheeting. The can or drum then serves as both the heat source for the sheeting and as the substrate for the cutting and edge sealing step. The sheeting may be unwound from the roll on to the hot can. A wheel 34 has a perimeter with at least one tool mounted thereon. Suitable exemplary tool designs are described in detail in Section III. At least one tool is spaced across the width of the sheeting, according to the desired width of each strip of sheeting. As the wheel rotates, each tool initially contacts the sheeting, thereby pressing each tool, the sheeting, and the substrate together. Each tool preferably is placed under sufficient pressure to have its tool press against and through a majority of the thickness of the sheeting. Generally a pressure of 2.1 to 3.5 kilograms per square centimeters is sufficient to push the tool through a majority of the thickness of typical sheeting materials, but any suitable combination of pressure and sheeting may be used. Wheel diameter may be chosen to enhance the temperature regulation of the tool. For example, a larger wheel diameter turning at a given revolution per minute may result in cooling of the tool. Preferably each wheel has a diameter between about 7 to 15 centimeters. The spacing between the tools is usually between about 5 to 10 centimeters, depending on the width of the sheeting desired and/or its particular specifications. The heated sheeting exits this cutting and edge sealing operation with substantially complete sealing of the edges.

A specific application for the slitting and edge sealing methods described above is disclosed in the "Code of Federal Regulations" Transportation Section, Part 49, pages 226, 227, and 273 (October, 1996). For example, for Type V sheeting, specifications for the final product Grade DOT-C2 sheeting state that its width is not less than 50 millimeters. The length is 300 millimeters±150 millimeters. Moreover, at an entrance angle of 45 degrees and an observation angle of 0.5 degrees, the final product Grade DOT-C2 sheeting has a minimum photometric performance or coefficient of retroreflectivity in candela/lux/square meter of 15 for white and 4 for red. Since the preferred sealed edge typically has a width of 1.5 millimeters or less and there is a sealed edge on each side of the strip of sheeting, the area of the sealed edges compared to the area of the strips of sheeting is small so that retroreflectivity is retained.

Figure 4:
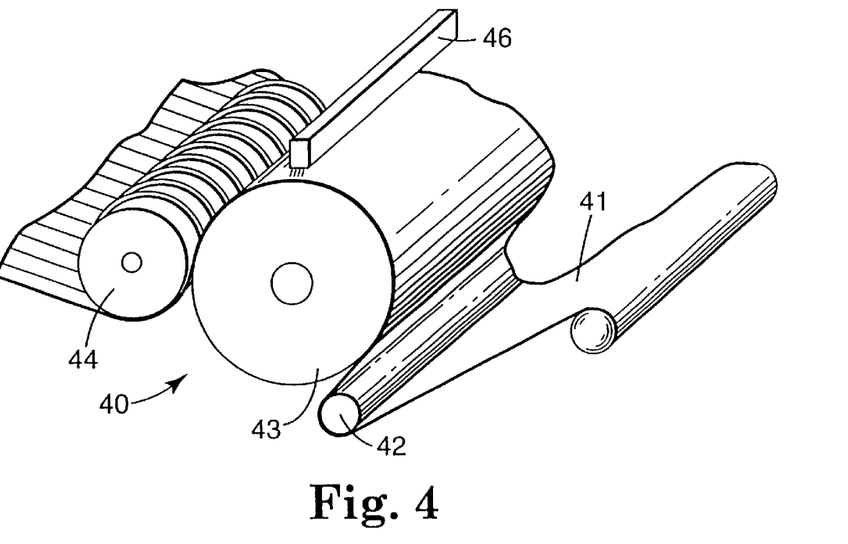
FIG. 4 is a schematic side view of a preferred variation of the apparatus illustrating external means for heating a substrate.

FIG. 4 is a preferred variation of the apparatus shown in FIG. 3. The sheeting 41 is passed around a tensioning roll 42 and then wrapped onto a rotating hot can 43 as before. A wheel 44 having at least one tool thereon is mounted as before to provide means for cutting and slitting the heated sheeting. Additional external heating means 46, such as a quartz heater, is mounted as shown to quickly raise the temperature of the hot can when the sheeting is moving around the hot can. When the sheeting is not moving but remains in contact with the hot can, the external heating means may be turned off so that the heated sheeting does not degrade while resting for extended periods on the hot can.

III. Tool Designs

Figure 5:
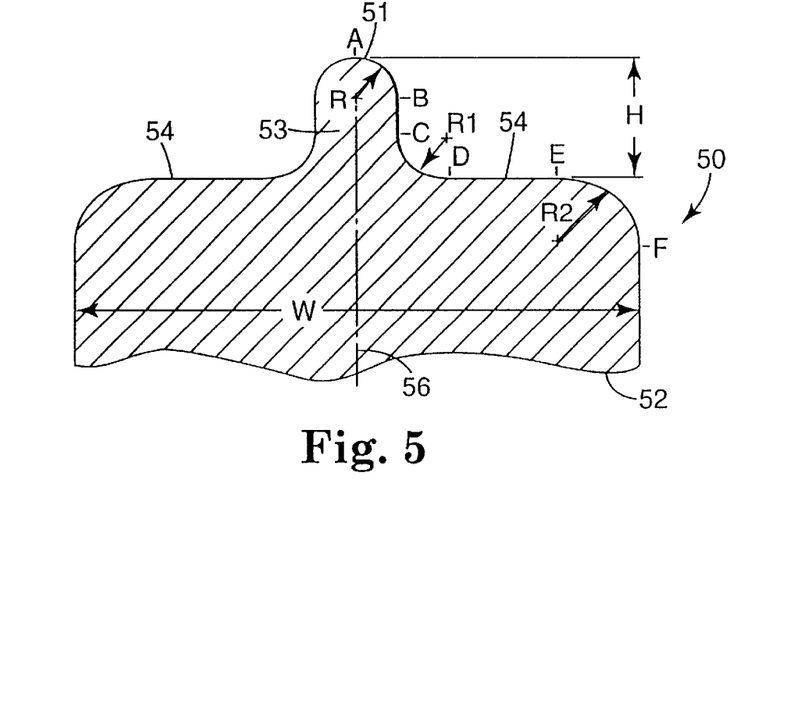
FIG. 5 is a cross sectional view of a tool.

FIG. 5 is a cross section of a suitable tool 50 having a first end 51 and a second end 52, the first end for cutting and edge sealing having a radiused ridge 53 thereon, and the second end for mounting onto a device (not shown). The device is usually movable, such as by a press or a wheel. Preferably the tool has a symmetrical cross section. The ridge has a cutting and edge sealing portion, which has a shape approximately corresponding to that desired for the edge seal. The ridge is smooth and rounded, with the highest point of the ridge labeled A. Preferably the ridge is semi-circular in cross-section with a radius R. The radius R forms a half circular sector, with a quarter of the circle defined by the points A and B. The radius of the ridge is preferably between about 0.05 to 0.3 millimeters. It is surprising that an unheated tool having a radiused ridge can cut the sheeting. There are opposing shoulders 54 on either side of point A. The shoulders are defined by the radii R1 and R2. Typical values for R1 and R2 are preferably between about 0.05 to 0.3 millimeters and more preferably between about 0.25 to 0.5 millimeters, respectively. Preferably the center for the quarter circle sector formed by R1 is spaced approximately 0.5 millimeters apart and 0.1 millimeter below the center for the radius R of the ridge. The radius R1 forms a quarter circle sector shown by points C and D. Preferably the center for the quarter circle sector formed by R2 is spaced approximately 1 millimeter apart and 0.6 millimeters below the center for the radius R of the ridge. The radius R2 forms a quarter circle sector shown as points E and F. A height H of the ridge was defined as the vertical distance between the point A of the ridge and the point E of the shoulder. Using preferred dimensions above, the height of the ridge is 0.36 millimeters. A preferred height is defined relative to the thickness T of the sheeting. Thus the fraction of H/T is less than one but more than 0.2. More preferably, the fraction of H/T is between about 0.3 to 0.8. Thus, if the height of the tool is 0.36 millimeters and the thickness of the sheeting is 0.5 millimeters, HWT is calculated to be 0.7. There may be curvilinear portions, such as a curved portion between points B and C or a curved portion between points D and E. These curvilinear portions may be slanted to either the horizontal or vertical directions. For example, curved portion BC is preferably slanted at an angle of 5 degrees from the vertical direction. Curved portion DE is preferably slanted at an angle of 5 degrees to the horizontal direction. The width W of the tool is as wide or wider than the desired width of the sealed edge. The width of the tool is typically about 1.8 millimeters. Since the preferred width of the sealed edge is less than 1.5 millimeters, this width of the tool is sufficient to ensure a satisfactory edge seal. This tool is symmetrical because the shoulders are centered on the centerline 56.

The inventive shape of the tool described above results in the sealed edges of the heated sheeting having no sharp corners or flats. Rounding of the sealed edge is also believed to be assisted by the surface tension effect depending on the chemical compositions of the encapsulating members. It will be appreciated that although one preferred shape of the tool has been specifically defined, any shape of tool that results in smooth curved surfaces, such as drawn by a French curve, is preferred for cutting and edge sealing of the heated sheeting. Representative materials for the tool are carbide steel and high carbon steel, although any suitable durable material can be used. These materials are selected because the components of the sheeting are extremely abrasive and destructive to the tool. For example, glass microspheres are abrasive and the various members may contain fillers, colorants, or other additives dispersed therein that are abrasive.

Figure 6:
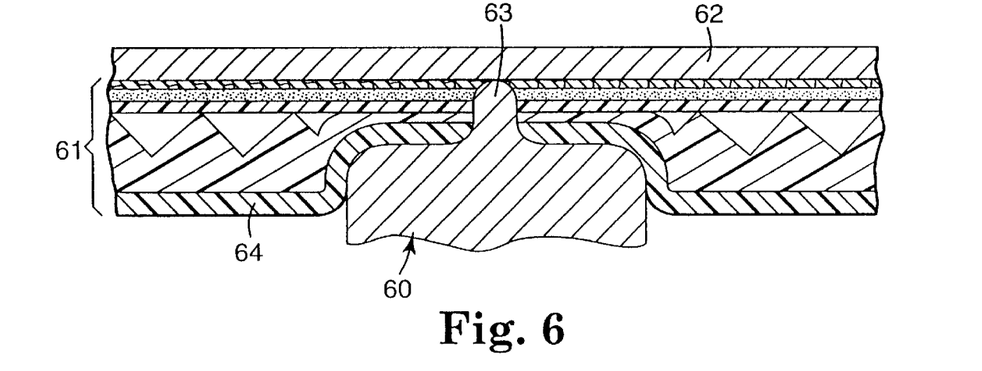
FIG. 6 is a cross sectional view of a tool and cellular sheeting showing the cutting and edge sealing step.

FIG. 6 is a cross section of the tool 60, the sheeting 61, and the substrate 62 being pressed together until the ridge 63 contacts the substrate. Ideally contact between the tool and the substrate is minimized, which minimizes wear on either the tool or the substrate. A radiused ridge on the tool also minimizes wear. FIG. 6 is a schematic depiction of what is believed to happen to the sheeting during the cutting and edge sealing step. The temperature of the sheeting increases when in contact with the hot substrate to form a heated sheeting. Alternately the sheeting may be pre-heated to form a heated sheeting. Preferably the tool, the heated sheeting and the substrate are pressed together. The tool initially presses against the face member 64. Pressure on the tool forces the tool through a majority of the thickness of the heated sheeting and squeezes the various encapsulating members of the heated sheeting together until the various members seal to each other and seal the edges. The edges are formed by the tool cutting the sheeting. During and after the sheeting is cut, a sealed edge results on each side of the heated sheeting. The temperature of the tool preferably remains at a lower temperature than the thermoforming temperature of the heated sheeting and/or temperature of the substrate partly because only the cutting and sealing portion of the tool is in contact with the heated sheeting and/or substrate. While not intending to be bound by theory, it is believed to be important to maintain the temperature of the tool lower than the temperature of the heated sheeting. The step of maintaining the temperature of the tool near room temperature is preferred because this step prevents debris from the sheeting from building on the tool and on the sealed edges. Preferably the tool is at a temperature of 30° C. or less and the heated sheeting is at a temperature of 70° C. or more. However the heated sheeting preferably should not be at a temperature so high that retroreflectivity is permanently damaged. It is surprising that in the Examples provided herein the thermoforming temperature did not significantly destroy the retroreflectivity of the sheeting.

Figure 7:
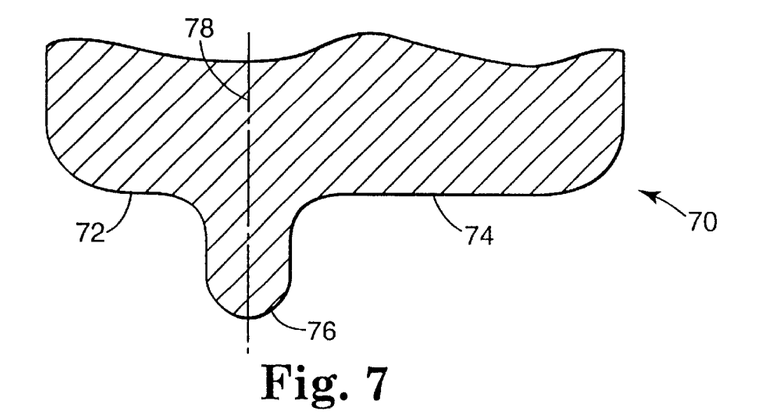
FIG. 7 is a cross sectional view of a non-symmetrical shaped tool.

FIG. 7 is a cross sectional view of a non-symmetrical tool 70 having a left shoulder 72 that is narrower than the right shoulder 74 because the radiused ridge 76 is not centered on the tool. The centerline 78 of the radiused ridge divides the shoulder into uneven portions. A non-symmetrical tool cuts the sheeting and gives different widths of sealed edges because, as shown in this case, the left shoulder is narrower than the right shoulder. The sealed edge on the sheeting resulting from the left shoulder of the tool would tend to be narrower than the sealed edge from the right shoulder of the tool. The sealed edge on the right side of the sheeting results from the left side of the tool, with the left side of the tool comprising the left shoulder and the left half of the radiused ridge.

Figure 8:
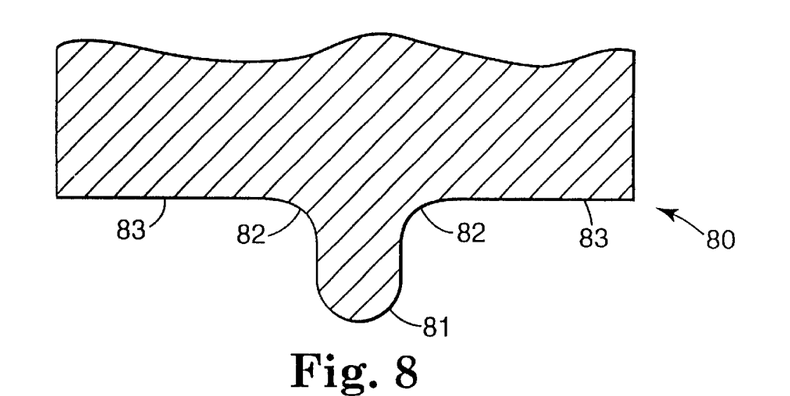
FIG. 8 is a cross sectional view of the tool showing opposing flat portions.

FIG. 8 is a cross sectional view of a tool 80 having a radiused ridge 81 with opposing shoulders wherein each shoulder has an flat portion 83 after the curved portion 82, with the curved portion of each shoulder jointing a side of the radius ridge. Although the radiused ridge and the curved portion of the shoulder function to seal the edge of the sheeting as before, the flat portion of the shoulder may assist in providing more surface area of the tool in contact with the sheeting for holding the sheeting in place during the sealing process.

Figure 9:
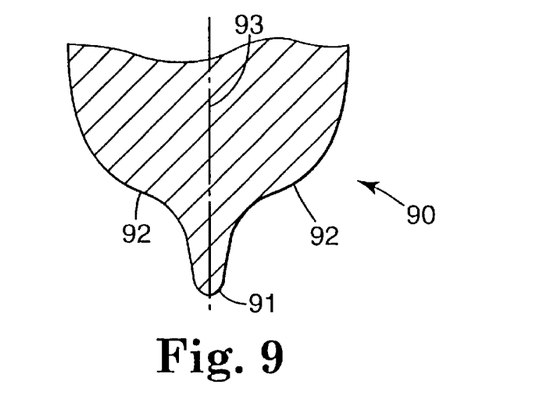
FIG. 9 is a cross sectional view of an elongated shaped tool.

FIG. 9 is a cross sectional view of a tool 90 having a radiused ridge 91 with opposing shoulders 92 such that each side of the ridge and each corresponding shoulder are formed as smooth curves, such as those drawn by a French curve. The tool may or may not be symmetric depending on the symmetry of the opposing shoulders around the center line 93. The advantage of this tool design is that a minimum area is in contact with the heated sheeting during cutting and edge sealing, thus maintaining the tool at a lower temperature than that of the heated sheeting without the need for exterior cooling of the tool.

Figure 10:
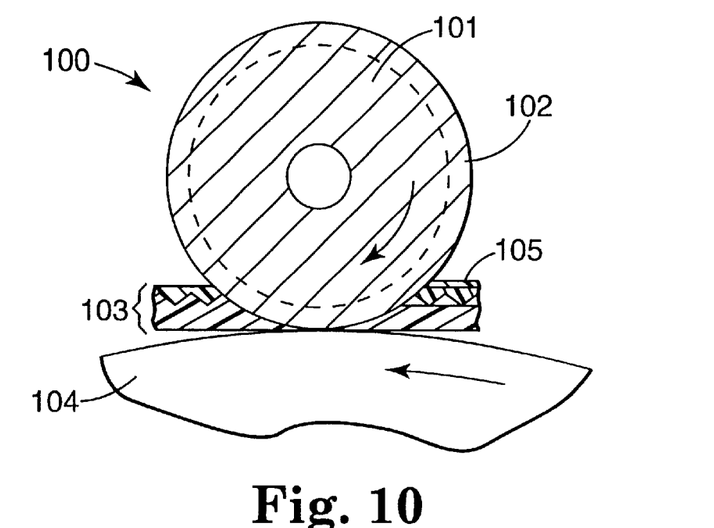
FIG. 10 is a side view of a wheel having at least one tool mounted on its perimeter such that rotation of the wheel presses the tool, the cellular sheeting, and the substrate together until each tool cuts and edge seals the cellular sheeting.

FIG. 10 is a side view of a device 100 in the form of a rotating wheel 101 having at least one annular or semi-cylindrically shaped tool 102 mounted on the perimeter of the wheel. Alternately each tool may be mounted on the perimeter of a wheel and the wheels spaced across the width of the sheeting. Preferably the cross section of the tool is as shown in FIG. 5. The sheeting 103 is shown on the substrate 104. Preferably the substrate is heated and thus the temperature of the sheeting increases when in contact with the hot substrate to form a heated sheeting. Alternately the sheeting may be pre-heated to form a heated sheeting. As shown, the tool gradual squeezes the heated sheeting toward the substrate. As the wheel presses against the heated sheeting, the face member 105 is contacted and compressed. Further rotation of the wheel squeezes all of the members of the sheeting together to initiate sealing. As the tool either nearly contacts or completely contacts the substrate, cutting results to form two edges, one on either side of the tool. The two edges formed by the cutting are completely sealed by the tool.

Figure 11:
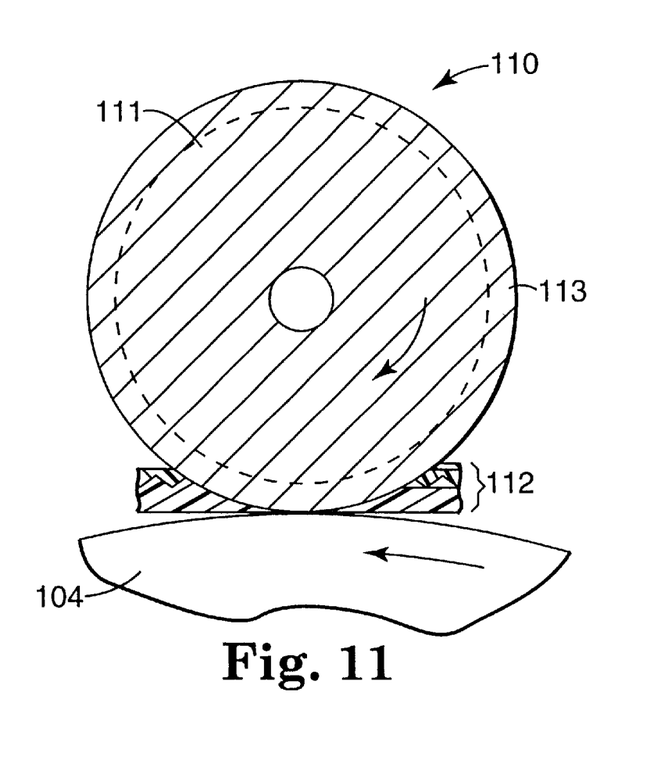
FIG. 11 is the same side view as that shown in FIG. 10, except that the wheel has a larger diameter.

FIG. 11 is a side view of the same device 110 as shown in FIG. 10, except the rotating wheel 111 has a larger diameter. The cutting and edge sealing step is believed to remain the same as previously described, except the squeezing of the heated sheeting 112 is much more gradual because the tool 113 rotates slower into the heated sheeting. This assumes the small diameter wheel of FIG. 10 and the large diameter wheel of FIG. 11 have the same rotational speed or revolutions per minute. Given that the rotational speed of the wheel is fixed, the advantage of a large diameter wheel is that the cutting and edge sealing process is slower and the tool remains at a lower temperature than with a small diameter wheel. Alternatively, the speed of the heated sheeting past the tool could be increased for the larger diameter wheel and still maintain the same temperature of the tool.

IV Results of Cutting and Edge Sealing Cellular Retroreflective Sheeting

Figure 12:
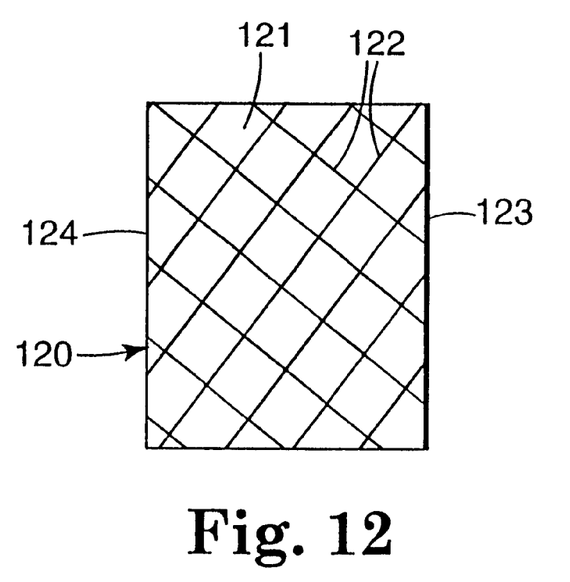
FIG. 12 is a plan view of cut and edge sealed cellular sheeting showing a representative pattern of seal leg members, a knife cut edge, and a sealed edge.

FIG. 12 is a plan view of the sheeting 120 after the cutting and edge sealing step. The shape of the interior encapsulated cells 121 formed by a pattern of seal leg members 122 is shown as square. However any closed continuous pattern of the seal leg members is suitable, including, for example, rectangular, hexagonal, chain link, and circular. The square pattern shown is typically approximately 4 by 4 millimeters. If the pattern were an elongated hexagonal pattern, then each air cell is typically 5 by 10 millimeters. The width of the seal leg members is typically 0.75 to 1 millimeters. The sealed edge 123 is parallel to the length of the sheeting. The width of the edge seal is preferably less than 1.5 millimeters. More preferably, the width of the edge seal is 0.75 to 1 millimeters, similar to the width of the seal leg members. However edge seals as narrow as only 0.25 millimeters are attainable with such narrow edge seals passing the water holdout test, which is described in Section V. The width of the sealed edge can be measured with a ruler. The sealed edge tends to have a different color than the remainder of the sheeting. Since the sealed area has little or no retroreflectivity, measuring the contrast between the brightness in retroreflection is another way to ascertain the width of the sealed edge or the percentage of sealed edge surface area to retroreflective sheeting surface area.

Normal slitting or just cutting 124, shown on the left side of the sheeting, leaves open cells along the edge, which is undesirable for the reasons previously described.

EXAMPLES

The present invention will now be described with reference to certain Examples, which are illustrative only. The following tests were used to evaluate cut and edge sealed samples of cellular retroreflective sheeting of the present invention.

A. Water Holdout Test for Evaluating Cell Integrity of Cellular Retroreflective Sheeting The purpose of the water holdout test is to evaluate the resistance of edge cells to withstand penetration by water. This test method is an evacuated and then water immersion method to evaluate the extent to which the process conditions yielded a hermetically sealed edge. The equipment consists of one 200–250 millimeter inside diameter PYREX glass desiccator, vacuum pump (0–1.0×10$^5$ Pascals) vacuum gauge, valve, and associated vacuum tubing, liquid dish soap (mild surfactant), and approximately 50-gram weight.

The desiccator is filled half full with tap water and 4–6 drops of the liquid dish soap is then added to the water. The test is run at room temperature (typically about 20–25° C.). The sample is immersed in the soap solution and held submerged by the 50-gram weight. The desiccator is closed. A vacuum pump is attached to the nozzle of the desiccator lid via a vacuum hose containing a gauge and a bleeder valve. The pressure in the desiccator is reduced to 85×10$^3$ Pascals below ambient pressure and maintained for one minute. The vacuum pump is then turned off and the bleeder valve is opened to allow air into the desiccator until the pressure is equalized to that of atmospheric pressure. The desiccator is opened and the sample removed. The amount of water intrusion into the edge cells is observed. Then the percent of unfilled edge cells is calculated by measuring the number of unfilled edge cells times 100 divided by the total number of edge cells along the length of the sample. Unfilled edge cells are those edge cells not containing water. The sheeting is considered satisfactory when at least 80 percent, preferably at least 90 percent and most preferably at least 95 percent of the edge cells are found to be unfilled with water. Desirably all of the edge cells are found to be hermetically sealed or unfilled with water.

B. Vicat Softening Point Test

The Vicat Softening Point of the indicated materials is determined according to ASTM D 1525.

C. Retroreflective Brightness Test

The coefficient of retroreflection $R_A$ is measured in accordance with standardized test ASTM D4956–94. $R_A$ values are expressed in candelas per lux per square meter (cd/lux/m2). The entrance angle is the angle between an illumination axis from a light source and a retroreflector axis normal to the surface of the retroreflective article. The entrance angle was selected to be −4 degrees. The observation angle is the angle between the illumination axis from the light source and the observation axis. The observation angle was chosen to be 0.2 degrees.

Example 1

A 120 centimeter wide roll of cellular cube corner retroreflective sheeting, available from 3M under the designation SCOTCHLITE DIAMOND GRADE™ Conspicuity Sheeting Series 981-32 red/white, was provided. This sheeting is designed for truck and trailer markings for enhanced visibility. The face member was a polymethylmethacrylate plastic that was thermally deformable at a temperature selected for edge sealing. The cube layer was polycarbonate, a relatively stable plastic at the temperature selected for edge sealing. This sheeting also had a sealing member, an adhesive layer, and a protective liner. The sealing member was polyethylene terephthalate, a plastic that also is thermally deformable at the temperature selected for edge sealing. The thickness T of the sheeting was approximately 0.45 millimeters. The sheeting had a length of approximately 45 meters and was wound into a roll.

The apparatus used for this experiment is shown in FIG. 3. The sheeting was unwound from the roll at approximately 13 meters per minute and then wrapped around a portion of the diameter of a hot can containing hot oil. The diameter of the can was approximately 60 centimeters. The surface temperature of the can was approximately 150° C. The temperature of the sheeting in contact with the hot can increased to approximately 110° C., thus forming a heated sheeting. Thus the thermoforming temperature was 110° C. The moving device was a wheel as shown in FIG. 3. The diameter of each wheel was approximately 7.5 centimeters. The wheel had a tool mounted thereon with the tools spaced at 50 millimeter intervals across the width of the heated sheeting. The preferred dimensions for the tool were used, as illustrated in FIG. 5. Thus the ridge of the tool had a radius R of approximately 0.13 millimeters. The shoulders were defined by R1 equal to 0.13 millimeters, and R2 equal to 0.38 millimeters. The center for the quarter circle sector formed by R1 was spaced approximately 0.5 millimeters apart and 0.1 millimeter below the center for the radius R of the ridge. The center for the quarter circle sector formed by R2 was spaced approximately 1 millimeter apart and 0.6 millimeters below the center for the radius R of the ridge The height H was equal to 0.26 millimeters. The fraction of H/T was 0.58. The width W of the tool was 1.8 millimeters. The temperature of each tool was approximately 30° C. The slit and sealed heated sheeting was then wound up as rolls 50 millimeters wide. When viewed from the side, each roll appeared to be smoothly slit and had a sharp, clean color because of the absence of sheeting debris. The width of the sealed edge was measured with a ruler to be 0.5 millimeters. When a sample of the sheeting, 6.25 centimeters wide by 15 centimeters long, was subjected to the water holdout test procedure, more than 95 per cent of the edge cells were found to be unfilled with water.

Example 2

This example used a different type of sheeting for cutting and edge sealing than used in Example 1. A 120 centimeter wide roll of cellular cube corner retroreflective sheeting, available from 3M under the designation SCOTCHLITE™ DIAMOND GRADE™ Conspicuity Sheeting Series 960 white, was provided. The face member comprised a polyurethane that was thermally deformable at the temperature selected for edge sealing. This sheeting also had an acrylic cube layer that was relatively stable at the temperature selected for sealing. A sealing member comprised a multiphase styrenic thermoplastic copolymer which was thermally deformable at the temperature selected for edge sealing. An adhesive layer and a protective liner were disposed beneath the sealing member. The thickness T of the sheeting was approximately 0.45 millimeters. The length of the sheeting was approximately 45 meters and was wound into a roll.

Using a method similar to that described in Example 1, the sheeting was unwound from the roll at approximately 13 meters per minute onto a hot can containing hot oil. The surface temperature of the can was approximately 100° C. The thermoforming temperature of the heated sheeting was approximately 75° C. The moving device was a wheel having a diameter of approximately 7.5 millimeter with tools mounted thereon and each tool spaced at 50 millimeters as described in Example 1. The tool design was also the same as described in Example 1. The temperature of each tool was approximately 25° C. The slit and sealed heated sheeting was then wound up as rolls 50 millimeters wide. When viewed from the side, each roll appeared to be smoothly slit and had a sharp, clean color because of the absence of sheeting debris. The width of the sealed edge was measured with a ruler to be 0.2 millimeters. When a sample of the sheeting, 6.25 centimeters wide by 15 centimeters long, was subjected to the water holdout test procedure, more than 95 per cent of the edge cells were found to be unfilled with water.

Example 3

This example is to show that the process need not be continuous. A press was used to press the tool into the sheeting to form a desired shape. A piece of the sheeting, as described in Example 2, which was 21 centimeters wide and 28 centimeters long, was placed onto a substrate that was rigid and flat. The temperature of both the substrate and the sheeting was adjusted to be approximately 75° C. The thermoforming temperature of the heated sheeting was 75° C. The tool had the same design as previously described in Examples 1 and 2. The second end of the tool was mounted on a stamper attached to a press, with the stamper shaped as a semi-circular segment of a cone having a width of 15 centimeters wide and arcuate length of 45 centimeters. The design of the tool, shown in FIG. 5, remained the same as in Example 1. The stamper was lowered, thereby pressing the tool through the heated sheeting. Lowering of the tool was stopped when the top of the ridge contacted the substrate. The tool was at a pressure of 3 kilograms per square centimeter. The tool was in contact with the heated sheeting for only a few seconds and thus remained near room temperature. On withdrawal of the tool from the heated sheeting, a segment of sheeting was stamped out of the original piece. Such segments of sheeting are useful to wrap around traffic cone devices. The sealed edge of this segment was found to have (1) a width of only 0.2 millimeters, and (2) more than 95 per cent of the edge cells unfilled with water when subjected to the water holdout test procedure.

The various modifications and alterations of this invention will be apparent to those skilled in the art without departing from the scope and spirit of this invention and this invention should not be restricted to that set forth herein for illustrative purposes only.

What is claimed is:

1. A method of cutting and edge sealing cellular retroreflective sheeting, comprising the steps of:
    positioning a cellular retroreflective sheeting on a substrate, wherein the sheeting has an initial thickness T;
    heating the sheeting to a thermoforming temperature to yield a heated sheeting;
    providing at least one tool having a rounded radiused ridge thereon, the ridge having a height H, wherein the fraction of H/T is less than one and at least 0.2;
    maintaining the tool at a temperature below the thermoforming temperature; and
    pressing the tool, the heated sheeting, and the substrate together until the tool cuts and edge seals the cells to form sealed edges.

2. The method of claim 1, wherein the sheeting comprises:
    a substantially transparent face member;
    a base member having a front side and a back side;
    a network of interconnecting seal leg members bonding the front side of the base member to the face member to form sealed cells; and
    retroreflective elements disposed within the cells, wherein the elements are arranged in substantially a layer with an air interface, and wherein at least one of the face member, base member, and seal leg member is thermoformable at the thermoforming temperature.

3. The method of claim 1, wherein the sealed edges have an average width less than 1.5 mm.

4. The method of claim 1, wherein at least 95% of the cells along the sealed edges are unfilled with water after being subjected to a water holdout test.

5. The method of claim 1, wherein the temperature of the tool is less than 30° C. and the thermoforming temperature of the heated sheeting is more than 70° C.

6. The method of claim 1, wherein the fraction of H/T is within the range of 0.3 to 0.8.

7. The method of claim 1, further comprising the steps of:
    rotating the substrate, the substrate comprising an internally heated can;
    unwinding the sheeting from a roll with the width of the sheeting rotating on the substrate to yield a heated sheeting;
    rotating at least one wheel having a perimeter with at least one tool mounted thereon, each tool spaced across the width of the sheeting; and
    pressing the tool, the heated sheeting, and the substrate together until the tool cuts and edge seals the cells to form sealed edges.

8. The method of claim 7, comprising the additional step of:
    increasing a diameter of at least one of the wheels for maintaining the temperature of the tool lower than the thermoforming temperature of the heated sheeting.

9. The method of claim 7, comprising the additional step of:
    blowing gas onto the tool for maintaining the temperature of the tool below the thermoforming temperature of the heated sheet.

10. The method of claim 6, comprising the additional step of:
    adding heat to the heated sheeting using a heat source external to the substrate.

11. The method of claim 1 wherein the radiused ridge has a radius of about 0.05 millimeter to about 0.3 millimeter.

12. The method of claim 1 wherein the ridge is semicircular in cross-section.

13. The method of claim 1 wherein the tool further comprises opposing radiused shoulders.

14. The method of claim 13 wherein the opposing radiused shoulders are symmetrical.

15. The method of claim 1 wherein the tool has a symmetrical cross-section.

16. The method of claim 1 wherein the radiused ridge seals the edge of the sheeting.

17. The method of claim 1 wherein the sealed edges of the sheeting have no sharp corners or flats.

* * * * *

UNITED STATES PATENT AND TRADEMARK OFFICE
CERTIFICATE OF CORRECTION

PATENT NO. : 6,224,792 B1
DATED : May 1, 2001
INVENTOR(S) : Jeffrey D. Janovec

Page 1 of 1

It is certified that error appears in the above-identified patent and that said Letters Patent is hereby corrected as shown below:

Column 3,
Line 47, "maxiniized" shoiuld read -- maximized --.

Column 4,
Line 32, "contror" should read -- control --.

Column 6,
Line 44, "contror" should read -- control --.

Column 9,
Line 50, "HWT" should read -- H/T --.

Signed and Sealed this

Twelfth Day of March, 2002

Attest:

JAMES E. ROGAN
Attesting Officer       Director of the United States Patent and Trademark Office